(12) United States Patent
Malik

(10) Patent No.: US 6,687,794 B2
(45) Date of Patent: Feb. 3, 2004

(54) PREFETCHING MECHANISM FOR DATA CACHES

(75) Inventor: Nadeem Malik, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 290 days.

(21) Appl. No.: 09/981,874

(22) Filed: Oct. 18, 2001

(65) Prior Publication Data

US 2003/0079088 A1 Apr. 24, 2003

(51) Int. Cl.[7] .............................................. G06F 12/00
(52) U.S. Cl. ...................... 711/137; 711/144; 711/159; 711/204; 711/213
(58) Field of Search ................................ 711/137, 144, 711/159, 204, 213

(56) References Cited

U.S. PATENT DOCUMENTS 5,142,634 A * 8/1992 Fite et al. .................. 712/240
5,283,873 A * 2/1994 Steely et al. ............... 712/207

* cited by examiner

Primary Examiner—Reba I. Elmore
(74) Attorney, Agent, or Firm—Duke W. Yee; Mark E. McBurney; Lisa L. B. Yociss

(57) ABSTRACT

A data structure to aid in and a method, system, and computer program product for prefetching data from a data cache are provided. In one embodiment, the data structure includes a prediction history field, a next line address field, and a data field. The prediction history field provides information about the success of past data cache address predictions. The next line address field provides information about the predicted next data cache lines to be accessed. The data field provides data to be used by the processor. When a data line in the data cache is accessed by the processor, determines the value of a prediction history field and the value of a next line address field. If the prediction history field is true, then the next line address in the next line address field is prefetched. Based on whether the next line actually utilized by the processor matches the next line address in the next line address field, the contents of the prediction history field and the next line address filed are modified.

20 Claims, 3 Drawing Sheets

| | PRED | NLA | CONVENTIONAL DATA CACHE LINE BITS |
|---|---|---|---|
| 402 | 11 | X | LINE A DATA |
| 404 | 10 | E | LINE B DATA |
| 406 | 00 | D | LINE C DATA |
| 408 | 11 | P | LINE J DATA |
| 410 | 11 | G | LINE K DATA |
| 412 | 10 | V | LINE F DATA |

414 — PRED
416 — NLA
418 — CONVENTIONAL DATA CACHE LINE BITS

US 6,687,794 B2

PREFETCHING MECHANISM FOR DATA CACHES

BACKGROUND OF THE INVENTION

1. Technical Field

The present invention relates generally to computer data caches and, more particularly, to data prefetching mechanisms.

2. Description of Related Art

A great amount of invention and research work has gone into improving the hit ratios of the instruction caches by prefetching or predicting the instruction references. However, similar level of improvements to data caches have remained an elusive goal. Instruction prefetching, as contrasted with data prefetching, has been relatively easy because program execution lends itself nicely towards prefetching due to the inherent high level of spatial locality. Furthermore, temporal locality can also be tapped easily by utilizing the branch target behavior.

While data references also exhibit temporal and spatial locality, the locality of reference s, unlike that of instruction references, is not dependent on the execution of the branch instructions, but more on the data addressed that are dynamically generated during the execution of the program. The lack of direct improvements to the hit ratio of the data caches has been somewhat made up for by other techniques, such as, for example, lock-up free caches, decoupled access architectures, early prediction of effective address of memory accesses, complier directed prefetching and load unit prefetching. However, the overall performance improvement is less because of the increased cycle time resulting from the implementation complexity of processor pipelines and./or from the extra instructions that must be executed to do the software based prefetching Furthermore, each of these approaches have other fundamental limitations.

For example, lock up free caches allow out-of-order instructions to continue execution in the presence of multiple outstanding cache misses, but do not help much if the code is highly interlocked. that is, if the instructions are sequentially dependent on the results of the previous instructions, such as, for example, in integer and commercial workload, there is not much benefit after the first outstanding miss. this is similarly true of decoupled access architectures. Complier directed prefetching on the other hand suffers from the inability to handle dynamic run time behavior. The benefit is even less if this slows down the processor's clock cycle time.

While all of the above techniques de help reduce the penalty from cache misses, a more direct solution for improving the performance of a data cache the reduces the effective miss rate is desirable.

SUMMARY OF THE INVENTION

The present invention provides a data structure to aid in and a method, system, and computer program product for prefetching data from a data cache. In one embodiment, the data structure includes a prediction history field, a next line address field, and a data field. The prediction history field provides information about the success of past data cache address predictions. The next line address field provides information about the predicted next data cache lines to be accessed. The data field provides data to be used by the processor. When a data line in the data cache is accessed by the processor, determines the value of a prediction history field and the value of a next line address field. If the prediction history field is true, then the next line address in the next line address field is prefetched. Based on whether the next line actually utilized by the processor matches the next line address in the next line address field, the contents of the prediction history field and the next line address filed are modified.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
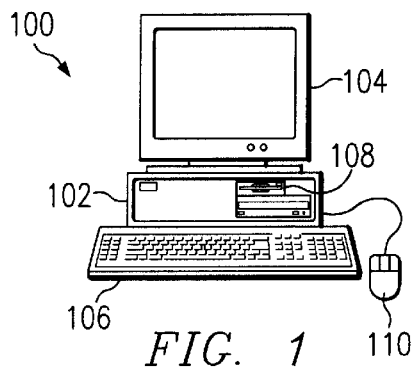
FIG. 1 depicts a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
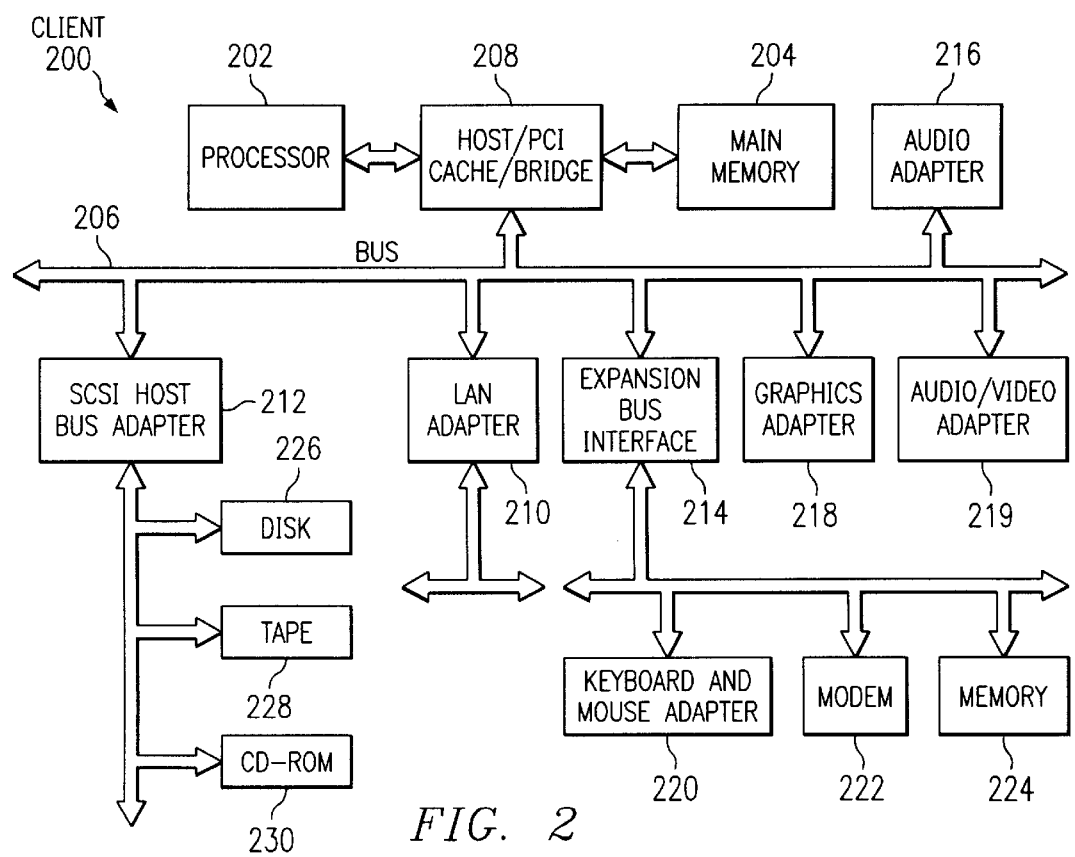
FIG. 2 depicts a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/ or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Figures 3, 4:
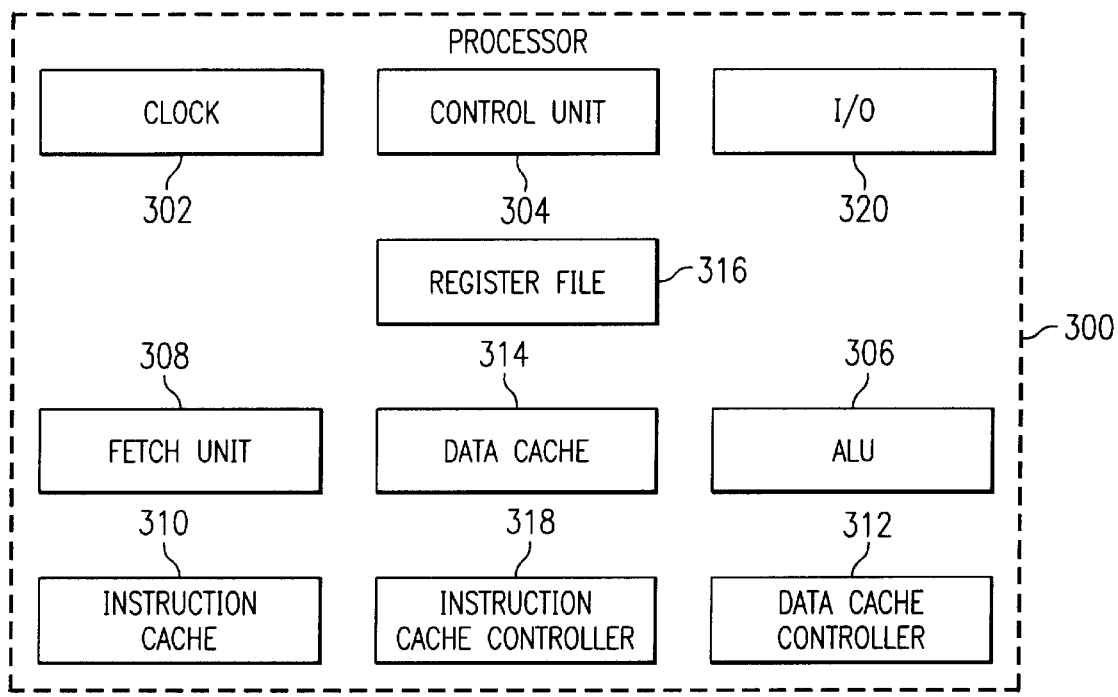
FIG. 3 depicts a block diagram of a processor in which the present invention may be implemented in accordance with the present invention.
FIG. 4 depicts a block diagram of a data cache which has a total of six cache lines in accordance with the present invention.

With reference now to FIG. 3, a block diagram of a processor in which the present invention may be implemented is depicted in accordance with the present invention. Processor 300 includes a control unit 304, a clock 302, a register file 316, an Arithmetic Logic Unit (ALU) 306, a fetch unit 308, a data cache 314, an instruction cache 310, a data cache controller 312, an instruction cache controller 318, and an input/output (I/O) unit 320. Control unit 304 locates, analyzes and executes each instruction in a software program. ALU 306 performs numeric calculating and comparing. Numbers are transferred from memory into the ALU 306 for calculation, and the results are sent back into memory. Alphanumeric data is sent from memory into the ALU 306 for comparing.

Fetch unit 308 prefetches instructions and data from main memory (not shown) in anticipation of what the processor 300 will need and stores the instructions and data in instruction cache 310 and data cache 314. Instructions and data in the instruction cache 310 and data cache 314 are read at a higher rate by processor 300 than instructions and data contained in main memory. Clock 302 issues clock cycles to each of the units 304–320 in processor 300 to insure that operations in each unit 304–320 are synchronized to operations occurring in other units 304–320. Data cache controller 312 controls the operations of data cache 314. Instruction cache controller 318 controls the operations of instruction cache 310.

Register file 316 stores results generated by ALU temporarily. I/O unit 320 provides a mechanism for retrieving instructions and data from other components within the data processing system outside of the processor 300 and for providing the results generated by processor 300 to other components of the data processing system.

Control unit 304 or some other unit within processor 300 contains logic for determining whether to prefetch data into data cache 314 based on the contents of prediction bits and next address line bits contained within each line of data in data cache 314. More details about this logic is provided below.

Processor 300 is provided as an example of a processor in which the present invention may be implemented and is not meant to imply any architectural limitations regarding the present invention.

The innovative prefetching mechanism for data caches of the present invention provides a technique to increase the performance of the data cache by reducing the possibility of a data cache miss. This is achieved by adding an address field which contains the address of the cache line that was previously accessed after that line. The address field also contains a set of prediction bits (a minimum of two) to indicate the past history of the success of the cache line prediction. The prediction history is used by the cache management hardware to determine if the next cache line should indeed be prefetched or if the address should be replaced by another cache line address. The prediction bits can be used in several different ways to allow the prefetch or displace a previous cache line address with a new one.

However, for the purposes of illustration of the basic technique and referring to FIG. 4, a block diagram of a data cache which has a total of six cache lines is depicted in accordance with the present invention. Also for purposes of illustration, assume that the address space has twenty-four lines (line A through X). Each line 402–412 has a Next Line Address (NLA) field 416 and two prediction bits 414 in addition to the conventional data cache line bits field 418. The congruent classes of address space are {A,G,M,S}, {B,H,N,T}, {C,I,O,U}, {D,J,P,V}, {E,K,Q,W}, and {F,L,P, X}.

Figure 5:
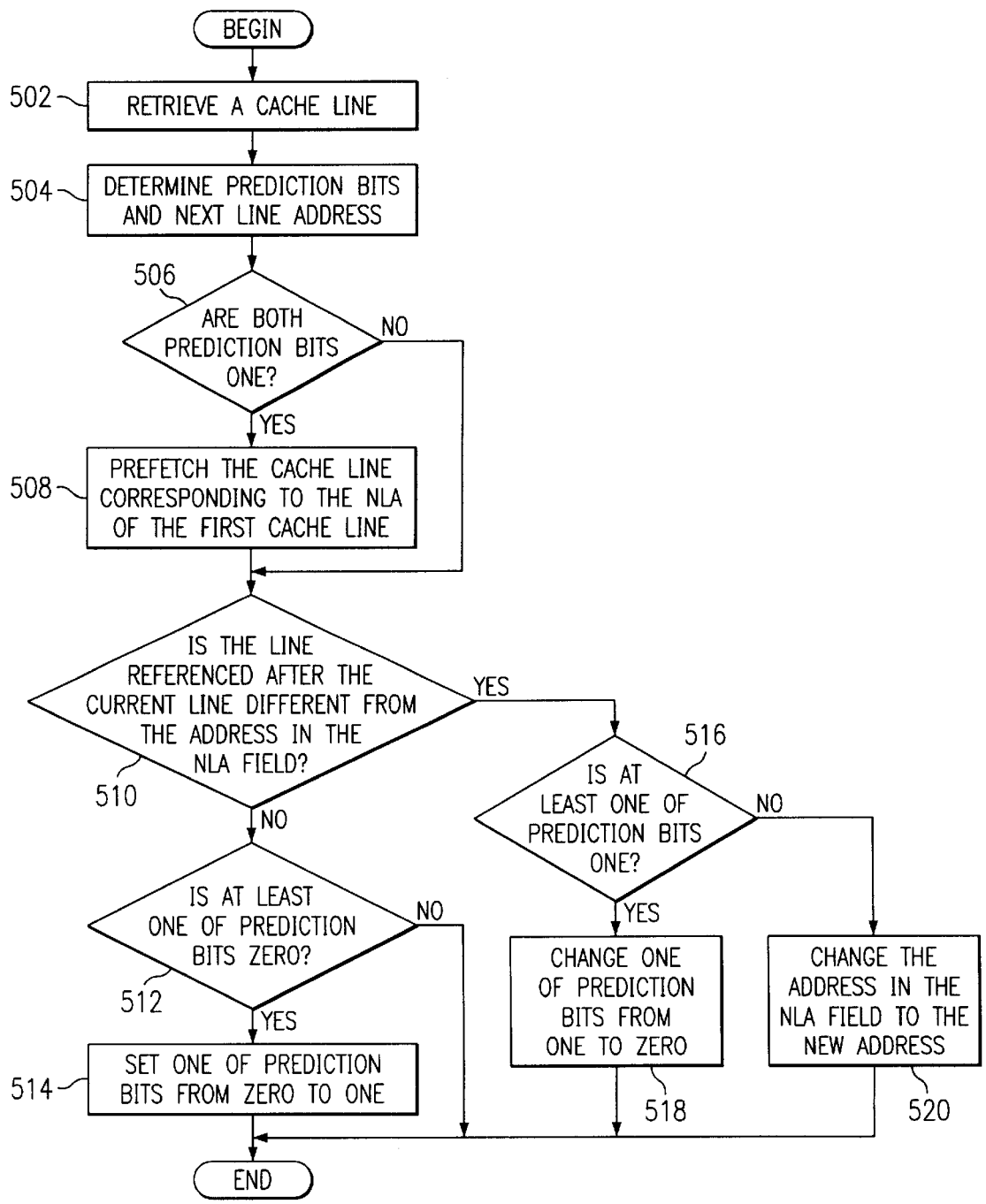
FIG. 5 depicts a process flow and program function for utilizing two prediction bits and an NLA in order to reduce the possibility of data cache misses in accordance with the present invention.

With reference now to FIG. 5, a process flow and program function for utilizing two prediction bits and an NLA in order to reduce the possibility of data cache misses is depicted in accordance with the present invention. To begin, a cache line is retrieved from the data cache (step 502) and the prediction bits and next line address (NLA) are determined (step 504). The processor determines whether both prediction bits are one (step 506) and if so, the cache line corresponding to the NLA of the first cache line are prefetched (step 508). If both prediction bits are not one or after successfully prefetching the cache line corresponding to the NLA of the first cache line, the processor determines whether the line referenced after the current line is different from the address in the NLA field (step 510).

If the line referenced after the current line is different from the address in the NLA field, then the processor determines if at least one of the prediction bits is one (step 516). If at least one of the prediction bits is one, then one of the prediction bits is changed from a one to a zero (step 518) and the process ends or, if there is more data to retrieve, continues in step 502 with the next data cache line retrieved. If neither of the prediction bits are one, then the address in the NLA field is changed to the address of the line actually referenced after the current line (step 520) and the process ends or, if there is more data to retrieve, continues in step 502 with the next data cache line retrieved.

If the line referenced after the current line retrieved in step 502 is not different from the address in the NLA field, the processor determines whether at least one of the prediction bits is zero (step 512). If at least one of the prediction bits is zero, then the processor sets one of the prediction bits from zero to one (step 514) and the process ends or, if there is more data to retrieve, continues with step 502 with the next data cache line retrieved. If both prediction bits are one, then the process ends or, if there is more data to retrieve, continues with step 502 with the next data cache line retrieved.

To summarize the use of two prediction bits and the NLA field with reference to FIG. 4, if both prediction bits are zero, the address of the line that is referenced next is placed into its NLA field and the first predictor bit is set to one. If the two lines are again accessed in the same order, then both predictor bits are set to one. If a cache line is fetched and if both the predictor bits are one, the line corresponding to the address in the NLA of the first line is also fetched. If only one prediction bit is set to one, the line corresponding to the NLA is not prefetched, but the other prediction bit is also set to one. If either one bit or both the two bits are one and it turns out the line referenced after the current line does not match with the address in the NLA field, one of the prediction bits is set to zero. If only one prediction bit is one, then after such a misprediction, both the prediction bits will end up being zero and the NLA will be replaced with the line of the data cache line actually utilized.

Thus, under the particular scheme as described above, a line is prefetched only if both the prediction bits are one and a new next line address is placed in the NLA field if both bits are zero. This allows a random access pattern to be weeded out from the prefetching, thus reducing the probability of a prefetch mismatch. Other different prefetching schemes can be employed having more prediction bits than described above. For example, extra prediction bits could be used to predict the next line after the next line. Thus, for example, prediction bits of "1111" would prefetch the next two lines corresponding to two NLAs while "1100" would prefetch the next line only. Furthermore, in other embodiments, the meaning ascribed to each prediction bit may vary. However, one of the fundamental qualities of the various embodiments is that each line provides a prediction for prefetching the next likely line to be accessed from the cache.

The above exemplary method shows just one of the ways that two prediction bits can be used. Many other combinations are possible with varying degrees of performance.

The present invention is in some ways analogous to the branch target buffer that is used for speculative instruction execution. However, while both approaches have a target address and prediction bits, the application of the branch target buffer is quite different from the present invention. The branch target buffer (BTB) entries are indexed with the address of the branch instructions and, on a match, the address in the BTB is used to indicate the next instruction address that can potentially be executed after a control transfer instruction. The address field in the NLA, on the other hand, indicates the line of the data cache that can be potentially fetched after the current line. The prediction bits in the BTB indicate how many times the branch was correctly predicted to be taken while the bits in the NLA indicate the probability of the cache line address referenced after the current line. Thus, not only does the BTB and the present invention have different characteristics, their applications are also quite different.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data cache in a processor for storing data for access by an application program being executed within the processor, comprising:

a data structure stored in the data cache, the data structure including information used by the processor and including:

a plurality of data lines in the data cache, each of the data line comprising:
a prediction history field, wherein the prediction history field provides information about the success of past data cache address predictions;
a next line address field, wherein the next line address field provides information about the predicted next data cache lines to be accessed; and
a data field, wherein the data field provides data for use by the processor.

2. The data cache as recited in claim 1, wherein the prediction history field contains two bits and the next line address field contains a single address, wherein the data corresponding to the single address provided by the next line address field is only prefetched if both bits are true.

3. A method for prefetching data in a data cache, the method comprising:
retrieving a data cache line;
determining the value of a prediction history field;
determining the value of a next line address field;
responsive to a determination that the prediction history is true for at least a first next line, prefetching the first next line in the data cache corresponding to the first next line address in the next line address field.

4. The method as recited in claim 3, further comprising:
responsive to a determination that the prediction history is false, and responsive to a determination that the predicted next line address contained in the next line address field does not match the next address actually utilized by the processor, changing the contents of the next line address field to match the next address actually utilized by the processor.

5. The method as recited in claim 3, further comprising:
responsive to a determination that the predicted next line address is different from the next line actually utilized by the processor and a determination that the prediction field is true, changing the prediction field value to an intermediate value between true and false.

6. The method as recited in claim 3, further comprising:
responsive to a determination that the predicted next line address is different from the next line actually utilized by the processor and a determination that the prediction field value is an intermediate value between true and false, changing the prediction field value to false.

7. The method as recited in claim 3, wherein the prediction field comprises two bits, wherein two ones indicate that the address line contained in the next address lines field was accessed immediately after the present address in at least two of the previous three times that the present address line was accessed, wherein a one and a zero indicate that the address line in next address line field has was accessed immediately after the present address line in at least one of the previous two times the present address was accessed, and wherein two zeros in the prediction field indicates that the line address in the next line address was accessed the previous time the present address line was accessed and is different from the address line accessed immediately after the present address line the twice previous time the present address line was accessed.

8. The method as recited in claim 3, wherein the prediction field comprises four bits and the next address lines field comprises two addresses wherein two of the four bits contain information about the history of accessing a first address in the next address lines field and two other bits contain information about the history of accessing second address in the next address lines field wherein the first address is the predicted address of the next line to be accessed after a current line and the second address is the predicted address of the line to be accessed after the next line.

9. A computer program product in a computer readable media for use in a data processing system for prefetching data in a data cache, the computer program product comprising:
first instructions for retrieving a data cache line;
second instructions for determining the value of a prediction history field;
third instructions for determining the value of a next line address field;
fourth instructions, responsive to a determination that the prediction history is true for at least a first next line, for prefetching the first next line in the data cache corresponding to the first next line address in the next line address field.

10. The computer program product as recited in claim 9, further comprising:
fifth instructions, responsive to a determination that the prediction history is false, and responsive to a determination that the predicted next line address contained in the next line address field does not match the next address actually utilized by the processor, for changing the contents of the next line address field to match the next address actually utilized by the processor.

11. The computer program product as recited in claim 9, further comprising:
fifth instructions, responsive to a determination that the predicted next line address is different from the next line actually utilized by the processor and a determination that the prediction field is true, for changing the prediction field value to an intermediate value between true and false.

12. The computer program product as recited in claim 9, further comprising:
fifth instructions, responsive to a determination that the predicted next line address is different from the next line actually utilized by the processor and a determination that the prediction field value is an intermediate value between true and false, for changing the prediction field value to false.

13. The computer program product as recited in claim 9, wherein the prediction field comprises two bits, wherein two ones indicate that the address line contained in the next address lines field was accessed immediately after the present address in at least two of the previous three times that the present address line was accessed, wherein a one and a zero indicate that the address line in next address line field has was accessed immediately after the present address line in at least one of the previous two times the present address was accessed, and wherein two zeros in the prediction field indicates that the line address in the next line address was accessed the previous time the present address line was accessed and is different from the address line accessed immediately after the present address line the twice previous time the present address line was accessed.

14. The computer program product as recited in claim 9, wherein the prediction field comprises four bits and the next address lines field comprises two addresses wherein two of the four bits contain information about the history of accessing a first address in the next address lines field and two other bits contain information about the history of accessing second address in the next address lines field wherein the first address is the predicted address of the next line to be accessed after a current line and the second address is the predicted address of the line to be accessed after the next line.

15. A system in a computer readable media for use in a data processing system for prefetching data in a data cache, the system comprising:

first means for retrieving a data cache line;

second means for determining the value of a prediction history field;

third means for determining the value of a next line address field;

fourth means, responsive to a determination that the prediction history is true for at least a first next line, for prefetching the first next line in the data cache corresponding to the first next line address in the next line address field.

16. The system as recited in claim 15, further comprising:

fifth means, responsive to a determination that the prediction history is false, and responsive to a determination that the predicted next line address contained in the next line address field does not match the next address actually utilized by the processor, for changing the contents of the next line address field to match the next address actually utilized by the processor.

17. The system as recited in claim 15, further comprising:

fifth means, responsive to a determination that the predicted next line address is different from the next line actually utilized by the processor and a determination that the prediction field is true, for changing the prediction field value to an intermediate value between true and false.

18. The system as recited in claim 15, further comprising:

fifth means, responsive to a determination that the predicted next line address is different from the next line actually utilized by the processor and a determination that the prediction field value is an intermediate value between true and false, for changing the prediction field value to false.

19. The system as recited in claim 15, wherein the prediction field comprises two bits, wherein two ones indicate that the address line contained in the next address lines field was accessed immediately after the present address in at least two of the previous three times that the present address line was accessed, wherein a one and a zero indicate that the address line in next address line field has was accessed immediately after the present address line in at least one of the previous two times the present address was accessed, and wherein two zeros in the prediction field indicates that the line address in the next line address was accessed the previous time the present address line was accessed and is different from the address line accessed immediately after the present address line the twice previous time the present address line was accessed.

20. The system as recited in claim 15, wherein the prediction field comprises four bits and the next address lines field comprises two addresses wherein two of the four bits contain information about the history of accessing a first address in the next address lines field and two other bits contain information about the history of accessing second address in the next address lines field wherein the first address is the predicted address of the next line to be accessed after a current line and the second address is the predicted address of the line to be accessed after the next line.

* * * * *